United States Patent
Ng-Thow-Hing

(10) Patent No.: US 10,585,278 B2
(45) Date of Patent: Mar. 10, 2020

(54) SURFACE MODELING SYSTEMS AND METHODS

(71) Applicant: MAGIC LEAP, INC., Plantation, FL (US)

(72) Inventor: Victor Ng-Thow-Hing, Los Altos, CA (US)

(73) Assignee: Magic Leap, Inc., Plantation, FL (US)

( * ) Notice: Subject to any disclaimer, the term of this patent is extended or adjusted under 35 U.S.C. 154(b) by 68 days.

(21) Appl. No.: 15/725,801

(22) Filed: Oct. 5, 2017

(65) Prior Publication Data
US 2018/0095276 A1 Apr. 5, 2018

Related U.S. Application Data

(60) Provisional application No. 62/404,617, filed on Oct. 5, 2016.

(51) Int. Cl.
*G02B 27/00* (2006.01)
*G02B 27/22* (2018.01)
(Continued)

(52) U.S. Cl.
CPC ....... *G02B 27/0093* (2013.01); *G02B 27/017* (2013.01); *G02B 27/0172* (2013.01);
(Continued)

(58) Field of Classification Search
CPC ............. G02B 27/0093; G02B 27/017; G02B 27/0172; G02B 27/225; G02B 27/2278;
(Continued)

(56) References Cited

U.S. PATENT DOCUMENTS

2009/0167763 A1* 7/2009 Waechter ................ G06T 15/06
345/426
2011/0074766 A1 3/2011 Page et al.
(Continued)

FOREIGN PATENT DOCUMENTS

WO WO2015077768 5/2015
WO WO2016077798 5/2016

OTHER PUBLICATIONS

Sarkar A., Biswas A., Dutt M., Bhattacharya A. (Jun. 15-17, 2016) Finding Largest Rectangle Inside a Digital Object. In: Bac A., Mari JL. (eds) Computational Topology in Image Context. CTIC 2016. Lecture Notes in Computer Science, vol. 9667. Springer, Cham; downloaded from web on Feb. 11, 2019 (Year: 2016).*

(Continued)

*Primary Examiner* — Mark Edwards
(74) *Attorney, Agent, or Firm* — Vista IP Law Group LLP

(57) ABSTRACT

A method of generating a surface model of a physical environment includes obtaining an image of the physical environment. The method also includes generating a planar polygon mesh from at least the image. The method further includes extracting a boundary polygon of the planar polygon mesh. Moreover, the method includes generating a convex hull for the boundary polygon of the surface mesh. In addition, the method includes generating a minimal area oriented boundary polygon from the convex hull. The method may also include generating a maximal area oriented internal polygon inside of the boundary polygon of the planar polygon mesh.

42 Claims, 12 Drawing Sheets

(51) Int. Cl.
G06F 3/01 (2006.01)
G06K 9/00 (2006.01)
G06T 19/00 (2011.01)
G02B 27/01 (2006.01)
H04N 13/194 (2018.01)
G06F 3/0481 (2013.01)
H04N 13/344 (2018.01)
G06F 3/03 (2006.01)
H04N 13/383 (2018.01)
G06T 17/20 (2006.01)
H04N 13/239 (2018.01)
G02F 1/29 (2006.01)

(52) U.S. Cl.
CPC ....... *G02B 27/225* (2013.01); *G02B 27/2278* (2013.01); *G06F 3/012* (2013.01); *G06F 3/016* (2013.01); *G06F 3/017* (2013.01); *G06F 3/0308* (2013.01); *G06F 3/0481* (2013.01); *G06F 3/04812* (2013.01); *G06F 3/04815* (2013.01); *G06K 9/00671* (2013.01); *G06T 17/20* (2013.01); *G06T 19/003* (2013.01); *H04N 13/194* (2018.05); *H04N 13/239* (2018.05); *H04N 13/344* (2018.05); *H04N 13/383* (2018.05); *G02B 2027/014* (2013.01); *G02B 2027/0178* (2013.01); *G02B 2027/0187* (2013.01); *G02F 1/292* (2013.01); *G06K 2209/40* (2013.01); *G06T 2210/12* (2013.01)

(58) Field of Classification Search
CPC ...... G02B 2027/014; G02B 2027/0178; G02B 2027/0187; H04N 13/383; H04N 13/344; H04N 13/194; H04N 13/239; G06F 3/012; G06F 3/016; G06F 3/017; G06F 3/0308; G06F 3/0481; G06F 3/04812; G06F 3/04815; G06K 9/00671; G06K 2209/40; G06T 17/20; G06T 19/003; G06T 2210/12; G02F 1/292
USPC .......................................................... 345/8
See application file for complete search history.

(56) References Cited

U.S. PATENT DOCUMENTS

| | | | |
|---|---|---|---|
| 2011/0178621 A1 | 7/2011 | Heide | |
| 2011/0286007 A1* | 11/2011 | Pangrazio | G01B 11/00 356/614 |
| 2011/0320319 A1* | 12/2011 | Streich | G06Q 30/06 705/27.1 |
| 2012/0056903 A1* | 3/2012 | Shinohara | G06F 3/013 345/676 |
| 2013/0314412 A1 | 11/2013 | Gravois et al. | |
| 2013/0318026 A1 | 11/2013 | Skogman et al. | |
| 2014/0182350 A1 | 7/2014 | Bhavaraju et al. | |
| 2014/0226898 A1 | 8/2014 | Lilja et al. | |
| 2014/0250393 A1* | 9/2014 | Goodson | G06F 3/14 715/765 |
| 2015/0062120 A1* | 3/2015 | Reisner-Kollmann | G06T 17/00 345/419 |
| 2015/0120260 A1 | 4/2015 | Taubin | |
| 2015/0205126 A1 | 7/2015 | Schowengerdt | |
| 2015/0242420 A1 | 8/2015 | Glover et al. | |
| 2016/0026253 A1 | 1/2016 | Bradski et al. | |
| 2016/0078663 A1 | 3/2016 | Sareen et al. | |
| 2016/0140769 A1 | 5/2016 | Reitmayr | |
| 2016/0247017 A1* | 8/2016 | Sareen | G06T 19/00 |
| 2016/0284123 A1* | 9/2016 | Hare | G06T 7/55 |
| 2017/0085366 A1* | 3/2017 | Poulo | H04L 7/08 |

OTHER PUBLICATIONS

Ng-Thow-Hing et al., The Memory Game: Creating a human-robot interactive scenario for ASIMO, DOI: 10.1109/IROS.2008.4651095 • Source: IEEE Xplore Conference: Intelligent Robots and Systems, 2008. IROS 2008 (Year: 2008).*

PCT International Search Report and Written Opinion for International Appln. No. PCT/US17/55313, Applicant Magic Leap, Inc., forms PCT/ISA/210, 220, and 237, dated Dec. 28, 2017 (20 pages). Extended European Search Report for EP Appln. No. 17859173.1 dated Sep. 18, 2019.

* cited by examiner

SURFACE MODELING SYSTEMS AND METHODS

CROSS-REFERENCE TO RELATED APPLICATIONS

The present application claims priority to U.S. Provisional Application Ser. No. 62/404,617, filed on Oct. 5, 2016 and entitled "SURFACE MODELING SYSTEMS AND METHODS," the contents of which is hereby expressly and fully incorporated by reference in its entirety, as though set forth in full. The present application is related to U.S. Provisional Patent Application Ser. No. 62/301,847, filed on Mar. 1, 2016, and U.S. Utility patent application Ser. No. 14/738,877 filed on Jun. 13, 2013 and Ser. No. 14/555,585 filed on Nov. 27, 2014. The contents of these patent applications are hereby expressly and fully incorporated by reference in their entirety, as though set forth in full.

FIELD OF THE INVENTION

The present disclosure relates to surface modeling using images captured by mobile camera systems.

BACKGROUND

Modern computing and display technologies have facilitated the development of systems for so called "virtual reality" ("VR"), "augmented reality" ("AR"), and/or "mixed reality" ("MR") experiences. This can be done by presenting computer-generated imagery to a user through a head-mounted display. This imagery creates a sensory experience which immerses the user in a simulated environment. VR systems typically involve presentation of digital or virtual image information without transparency to actual real-world visual input.

AR systems generally supplement a real-world environment with simulated elements. For example, AR systems may provide a user with a view of a surrounding real-world environment via a head-mounted display. Computer-generated imagery can also be presented on the head-mounted display to enhance the surrounding real-world environment. This computer-generated imagery can include elements which are contextually-related to the surrounding real-world environment. Such elements can include simulated text, images, objects, and the like. MR systems also introduce simulated objects into a real-world environment, but these objects typically feature a greater degree of interactivity than in AR systems.

Various optical systems generate images at various depths for displaying VR/AR/MR scenarios. Some such optical systems are described in U.S. Utility patent application Ser. No. 14/555,585 and Ser. No. 14/738,877, the contents of which have been previously incorporated by reference herein.

AR/MR scenarios often include presentation of virtual image elements in relationship to real-world objects. For example, referring to FIG. 1, an AR/MR scene 100 is depicted wherein a user of an/a AR/MR technology sees a real-world park-like setting 102 featuring people, trees, buildings in the background, and a concrete platform 104. In addition to these items, the user of the AR/MR technology perceives that they "see" a robot statue 106 standing upon the real-world platform 104, and a cartoon-like avatar character 108 flying by which seems to be a personification of a bumble bee, even though the robot statue 106 and the cartoon-like avatar character 108 do not exist in the real-world environment. While FIG. 1 schematically depicts an/a AR/MR scenario, the quality of the AR/MR scenario varies depending on the quality of the AR/MR system. FIG. 1 does not depict a prior art AR/MR scenario, but rather an AR/MR scenario according to an embodiment.

The visualization center of the brain gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with accommodation (or focusing) of the lenses of the eyes. Under normal conditions, accommodating the eyes, or changing the focus of the lenses of the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic VR/AR/MR configurations, is known to produce eye fatigue, headaches, or other forms of discomfort in users.

Stereoscopic wearable glasses generally feature two displays—one for the left eye and one for the right eye—that are configured to display images with slightly different element presentation such that a three-dimensional perspective is perceived by the human visual system. Such configurations have been found to be uncomfortable for many users due to a mismatch between vergence and accommodation ("vergence-accommodation conflict") which must be overcome to perceive the images in three dimensions. Indeed, some users are not able to tolerate stereoscopic configurations. These limitations apply to VR, AR, and MR systems. Accordingly, most conventional VR/AR/MR systems are not optimally suited for presenting a rich, binocular, three-dimensional experience in a manner that will be comfortable and maximally useful to the user, in part because prior systems fail to address some of the fundamental aspects of the human perception system, including the vergence-accommodation conflict.

VR/AR/MR systems such as the ones described in U.S. Utility patent application Ser. No. 14/555,585 address the vergence-accommodation conflict by projecting light at the eyes of a user using one or more light-guiding optical elements such that the light and images rendered by the light appear to originate from multiple depth planes. The light-guiding optical elements are designed to in-couple virtual light corresponding to digital or virtual objects, propagate it by total internal reflection ("TIR"), and then out-couple the virtual light to display the virtual objects to the user's eyes. In AR/MR systems, the light-guiding optical elements are also designed be transparent to light from (e.g., reflecting off of) actual real-world objects. Therefore, portions of the light-guiding optical elements are designed to reflect virtual light for propagation via TIR while being transparent to real-world light from real-world objects in AR/MR systems.

To implement multiple light-guiding optical element systems, light from one or more sources must be controllably distributed to each of the light-guiding optical element systems. The light is encoded with virtual image data that is rendered at a relatively high rate (e.g., 360 Hz or 1 KHz) to provide a realistic 3-D experience. Current graphics processing units ("GPUs") operating (e.g., rendering virtual content) at such speeds and at a high resolution consume a large amount of power (relative to the capacity of a portable battery) and generate heat that may be uncomfortable for a user wearing the AR/MR system.

AR/MR scenarios often include interactions between virtual objects and a real-world physical environment (e.g., the robot statue 106 standing upon the real-world platform 104 in FIG. 1). Similarly, some VR scenarios include interactions between completely virtual objects and other virtual objects.

Delineating surfaces in the physical environment facilitates interactions with virtual objects by defining the metes and bounds of those interactions (e.g., by defining the extent of a particular surface in the physical environment). For instance, if an AR/MR scenario includes a virtual object (e.g., a tentacle or a fist) extending from a particular surface in the physical environment, defining the extent of the surface allows the AR/MR system to present a more realistic AR/MR scenario. In one embodiment, if the extent of the surface is not defined or inaccurately defined, the virtual object may appear to extend partially or entirely from midair adjacent the surface instead of from the surface. In another embodiment, if an AR/MR scenario includes a virtual character walking on a particular horizontal surface in a physical environment, inaccurately defining the extent of the surface may result in the virtual character appearing to walk off of the surface without falling, and instead floating in midair.

To facilitate interactions between virtual objects and real-world physical environment, various AR/MR systems utilize fiducial markers (see ArUco markers 200 of FIG. 2) to provide position and orientation (i.e., pose) information for real-world physical surfaces on which the fiducial markers are placed. However, ArUco markers 200 do not provide any information relating to the extent of a physical surface. Moreover, few applications or situations are amenable to the placement of ArUco 200 markers on one or more surfaces in a real-world physical environment. For instance, ArUco markers 200 can alter the aesthetics of a surface by requiring a visible marker to be placed on that surface.

While some VR/AR/MR systems can generate polygon meshes to delineate and/or represent surfaces in the physical environment, such polygon meshes may provide too much information for facilitating interactions between virtual objects and real-world physical environment use. For instance, a VR/AR/MR system would need to further process polygon meshes for various applications/functions/ processes such as simulating physical collisions, simulating resting contact, and various lighting effects (e.g., shadows and reflections). Further processing of polygon meshes for these various applications/functions/processes with sufficient speed and resolution to enable a realistic, believable and/or passable VR/AR/MR experience can require many processor cycles. Processor related requirements may in turn impose performance (e.g., processor cycles for other functions such as rendering), power (e.g., battery life), heat (e.g., in view of proximity to user's body), and size (e.g., portability) related restrictions on VR/AR/MR systems. There exists a need for more abstract and easily digestible representations of the environment to represent key aspects of the environment, such as the location of large flat regions with minimal processing. Polygon meshes require further processing to abstract out useful information. The systems and methods described herein are configured to address these and other challenges.

SUMMARY

In one embodiment, a method of generating a surface model of a physical environment includes obtaining an image of the physical environment. The method also includes extracting a boundary polygon from at least the image. Moreover, the method includes generating a convex hull for the boundary polygon. In addition, the method includes generating a minimal area oriented boundary polygon from the convex hull.

In one or more embodiments, the method also includes generating a planar polygon mesh from at least the image. Extracting the boundary polygon from at least the image may include extracting the boundary polygon from the planar polygon mesh. Obtaining the image of the physical environment may include obtaining a 3-D point cloud corresponding to the physical environment using an imaging device, and obtaining pose information for the imaging device. The method may also include computing a truncated signed distance function for the 3-D point cloud using the pose information. Generating the planar polygon mesh may include tessellating the truncated signed distance function. The method may also include combining two smaller planar polygon meshes into one larger planar polygon mesh.

In one or more embodiments, the method also includes obtaining a gravity vector, where the generated planar polygon mesh is at least one of substantially parallel and orthogonal to the gravity vector. Generating the convex hull may include using a Graham-Scan algorithm. Generating the minimal area oriented boundary polygon may include using a rotating calipers algorithm. The minimal area oriented boundary polygon may be outside of the boundary polygon of the planar polygon mesh.

In one or more embodiments, the method also includes generating a maximal area oriented internal polygon inside of the boundary polygon of the planar polygon mesh. Generating the maximal area oriented internal polygon may include performing a search in a search area defined by the boundary polygon. Generating the maximal area oriented internal polygon may include forming a grid in the search area. The method may also include adjusting a resolution of the grid based on a size of the search area.

In one or more embodiments, the method also includes receiving a selection of a point inside of the boundary polygon of the planar polygon mesh. Generating the maximal area oriented internal polygon may include performing a search in a search area defined using the in selected point. Generating the maximal area oriented internal polygon may include forming a grid in the search area. The method may also include adjusting a resolution of the grid based on a size of the search area.

In one or more embodiments, the minimal area oriented boundary polygon and the maximal area oriented internal polygon may have a same shape. The planar polygon mesh may be generated based on a marching cubes algorithm. The minimal area oriented boundary polygon may be at least one of a rectangle, a triangle, and a circle. The method may also include determining a fit between the minimal area oriented boundary polygon and the boundary polygon. Determining a fit may include calculating a difference between a first area of the minimal area oriented boundary polygon and a second area of the boundary polygon.

In one or more embodiments, the method also includes storing data representing the minimal area oriented boundary polygon, where the minimal area oriented boundary polygon is a rectangle. The data may include four sets of coordinates corresponding to the rectangle. The data may also include a length of the rectangle, a width of the rectangle, and a center of the rectangle. Each of the four sets of coordinates may be a pair of coordinates. Generating the planar polygon mesh may include capturing static portions of a series of images of the physical environment.

In another embodiment, a system for generating a surface model of a physical environment includes an imaging device and an image processor operatively coupled to the camera. The image processor is configured to obtain an image of the physical environment at least partially from the imaging device. The image processor is configured also to extract a boundary polygon from at least the image. Moreover, the image processor is configured to generate a convex hull for the boundary polygon. In addition, the image processor is configured to generate a minimal area oriented boundary polygon from the convex hull.

In one or more embodiments, the system also includes a pose sensor operatively coupled to the imaging device and the image processor. The image processor may also be configured to compute a truncated signed distance function for the 3-D point cloud using the pose information. The image processor may further be configured to generate a planar polygon mesh from at least the image by tessellating the truncated signed distance function. Extracting the boundary polygon from at least the image may include extracting the boundary polygon of the planar polygon mesh. Obtaining the image of the physical environment may include obtaining a 3-D point cloud corresponding to the physical environment using the imaging device, and obtaining pose information for the imaging device using the pose sensor.

In one or more embodiments, the image processor is also configured to generate a planar polygon mesh from at least the image, and generate a maximal area oriented internal polygon inside of the boundary polygon of the planar polygon mesh. Generating the maximal area oriented internal polygon may include performing a search in a search area defined by the boundary polygon, forming a grid in the search area, and adjusting a resolution of the grid based on a size of the search area.

In one or more embodiments, the image processor is also configured to receive a selection of a point inside of the boundary polygon of the planar polygon mesh. Generating the maximal area oriented internal polygon may also include performing a search in a search area defined using the in selected point, and forming a grid in the search area. The image processor may also be configured to adjust a resolution of the grid based on a size of the search area. The minimal area oriented boundary polygon may be at least one of a rectangle, a triangle, and a circle.

In one or more embodiments, the image processor is also configured to storing data representing the minimal area oriented boundary polygon, wherein the minimal area oriented boundary polygon is a rectangle. The data may include four sets of coordinates corresponding to the rectangle. The data may also include a length of the rectangle, a width of the rectangle, and a center of the rectangle. Each of the four sets of coordinates may be a pair of coordinates. The image processor may also be configured to generate a planar polygon mesh from at least the image by at least capturing static portions of a series of images of the physical environment.

In one or more embodiments, the planar polygon mesh is generated using a marching cubes algorithm. The method may also include determining a central point in the minimal area oriented boundary polygon. The method may also include determining an orientation of the minimal area oriented boundary polygon. The method may also include determining a line normal to the minimal area oriented boundary polygon. The method may also include determining a coordinate system including the minimal area oriented boundary polygon.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings.

DETAILED DESCRIPTION

Figure 1:
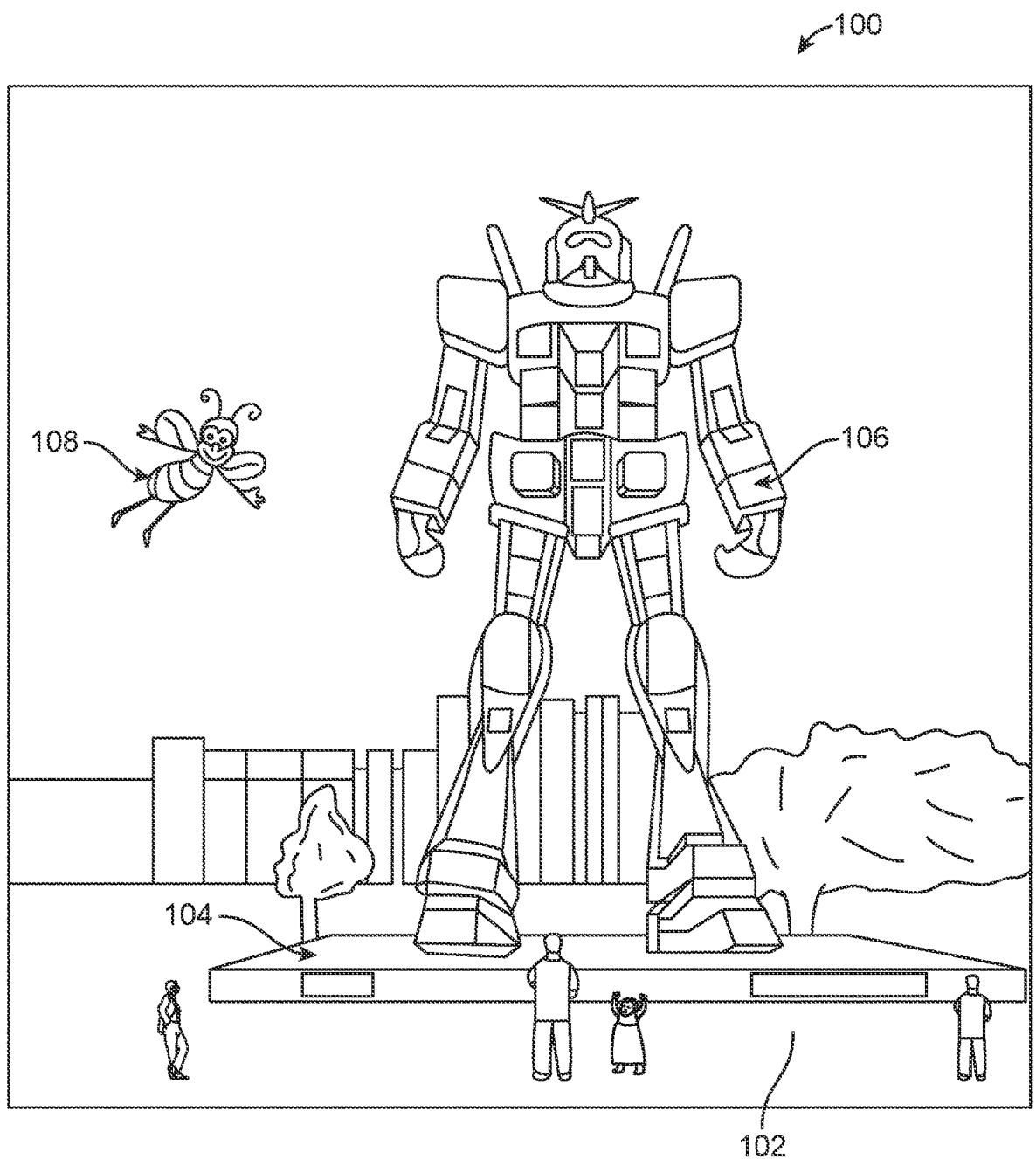
FIG. 1 is a schematic view of augmented or mixed reality through a wearable AR/MR user device, according to one embodiment.
Figure 2:
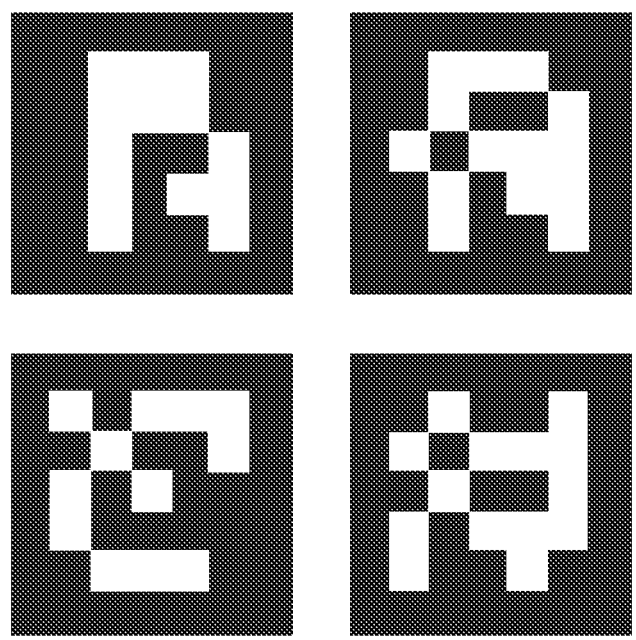
FIG. 2 depicts four ArUco fiducial markers, according to one embodiment.

Various embodiments of the disclosure are directed to systems, methods, and articles of manufacture for surface modeling systems in a single embodiment or in multiple embodiments. Other objects, features, and advantages of the disclosure are described in the detailed description, figures, and claims.

Various embodiments will now be described in detail with reference to the drawings, which are provided as illustrative examples of the disclosure to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

The surface modeling systems may be implemented independently of AR/MR systems, but many embodiments below are described in relation to AR/MR systems for illustrative purposes only.

Summary of Problem and Solution

In order to enable realistic interaction between virtual objects and a real-world physical environment, position, orientation, and extent of various surfaces in the physical environment must be determined and communicated to the processor (e.g., GPU) rendering the virtual objects. Information regarding surfaces in the physical environment allows the processor to render virtual objects such that they appear to obey physical laws (e.g., gravity) relative to the surfaces. Information regarding the surfaces also allows the processor to render the virtual objects such that they are consistent with the surfaces. An example is the display of virtual media (e.g., a comic book or a movie) on the surface of a wall or a table without the virtual media extending beyond the wall or table.

Some augmented reality (AR)/mixed reality (MR) systems utilize fiducial markers (e.g., ArUco markers) to provide the position and orientation of surfaces in a real-world physical environment. However, such markers may be intrusive and may not provide information relating to an extent (size, shape, and the like) of the surfaces. Other AR/MR systems generate a polygon mesh to model surfaces in the physical environment. However, many applications cannot utilize a polygon mesh without increased computationally expensive from further processing. Processor cycles spent on further processing of a polygon mesh cannot be used for other AR/MR system functions such as rendering high-definition image. Further, additional processing requires power, reducing battery life. Moreover, additional processing generates heat, potentially causing discomfort to a user wearing the AR/MR system. In addition, adding processors and/or batteries to perform the additional processing increases the minimum size of an/a AR/MR system.

AR/MR systems and methods described herein address these problems by extracting user friendly larger polygons (e.g., rectangles) from the smaller polygon mesh, then using the extracted larger polygons to model the surfaces of a physical environment. The systems and methods can extract the most useful polygons (e.g., horizontal and vertical planes). The extracted larger polygons are then stored in a simple and convenient data format, and sent to applications/functions/processes associated with the AR/MR system. Because the surfaces of the physical environment are modeled with extracted larger polygons, and because the larger polygons are stored in a simple and convenient data format, they can be used with minimal further processing to generate a realistic, high-definition AR/MR experience with minimal latency and processing requirements.

Augmented Reality/Mixed Reality Systems

Figure 3:
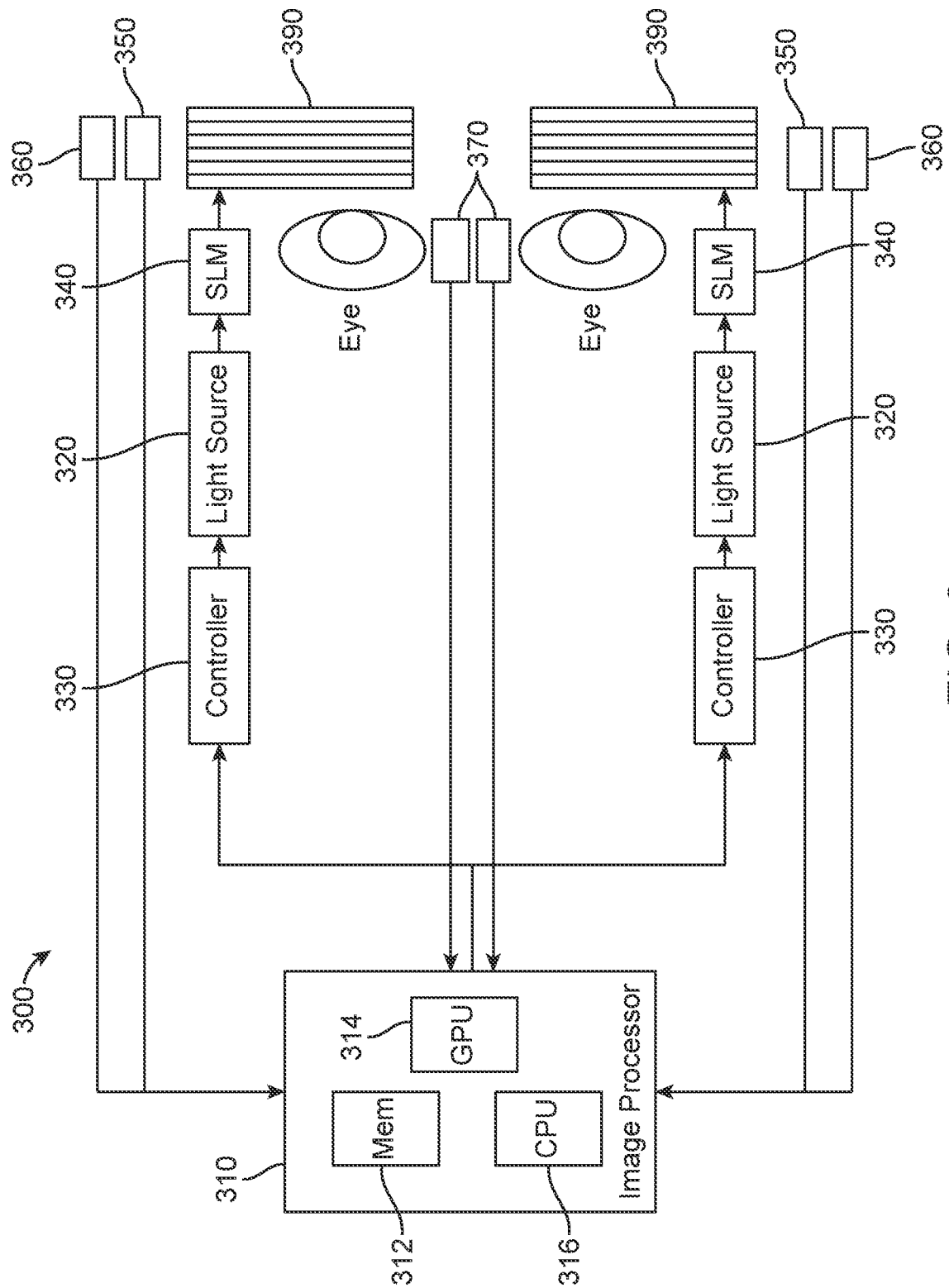
FIG. 3 is a block diagram depicting an AR/MR system, according to one embodiment.

FIG. 3 illustrates an AR/MR system 300 (hereinafter referred to as "system 300"), according to one embodiment. The system 300 uses one or more stacked light-guiding optical elements ("LOEs") 390 to guide light into a user's eyes at a respective one or more depth planes. The LOEs may be volume phase holograms or surface-relief holograms that are encoded/programmed/embedded with depth plane information to generate images that appear to originate from respective depth planes. In other words, a diffraction pattern, or diffractive optical element ("DOE") may be embedded within or imprinted upon an LOE such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane.

The system 300 includes an image processor 310, a light source 320, a controller 330, a spatial light modulator ("SLM") 340, a pair of forward facing field of view (FOV) cameras 350, a pair of pose sensors 360 corresponding to the forward facing FOV cameras 350, and at least one set of stacked LOEs 390 that functions as a multiple plane focus system. The system 300 may also include an eye-tracking subsystem 370. It should be appreciated that other embodiments may have multiple sets of stacked LOEs 390.

The image processor 310 is configured to generate virtual content to be displayed to the user. The image processor 310 may convert an image or video associated with the virtual content to a format that can be projected to the user in 3-D. For example, in generating 3-D content, the virtual content may need to be formatted such that portions of a particular image are displayed at a particular depth plane while others are displayed at other depth planes. In one embodiment, all of the image may be generated at a single depth plane. In another embodiment, the image processor 310 may be programmed to provide slightly different images to the right and left eyes such that when viewed together, the virtual content appears coherent and comfortable to the user's eyes.

The image processor 310 is also configured to generate a surface model of a real-world physical environment (e.g., from images and/or videos captured by the forward facing FOV cameras 350). In one embodiment, the image processor 310 is configured to generate the surface model without the use of fiducial markers. The surface model includes larger polygons approximating entire surfaces in the physical environment. In another embodiment, the surface model is free of meshes.

The image processor 310 may further include a memory 312, a GPU 314, a CPU 316, and other circuitry for image generation and processing, and surface modeling. The image processor 310 may be programmed with the desired virtual content to be presented to the user of the AR/MR system 300. The image processor 310 may also be programmed with one or more algorithms for generating a surface model from captured images and/or videos. In some embodiments, the image processor 310 may be housed in a wearable display unit of the system 300. In other embodiments, the image processor 310 and other circuitry may be housed in a belt pack that is coupled to the wearable display unit. The image processor 310 is operatively coupled to the light source 320 which projects the light associated with the desired virtual content and one or more spatial light modulators. The image processor 310 is also operatively coupled to the forward facing FOV cameras 350 and the pose sensors 360.

The light source 320 is compact and has high resolution. The light source 320 is operatively coupled to the controller 330. The light source 320 may be include color specific LEDs and lasers disposed in various geometric configurations. Alternatively, the light source 320 may include LEDs or lasers of like color, each one linked to a specific region of the field of view of the display. In another embodiment, the light source 320 may include a broad-area emitter such as an incandescent or fluorescent lamp with a mask overlay for segmentation of emission areas and positions. Although the light source 320 is directly connected to the AR/MR system 300 in FIG. 3, the light source 320 may be connected to system 300 via optical fibers (not shown). The system 300 may also include condenser (not shown) configured to collimate the light from the light source 320.

The SLM 340 may be reflective (e.g., an LCOS, an FLCOS, a DLP DMD, or a MEMS mirror system), transmissive (e.g., an LCD) or emissive (e.g. an FSD or an OLED) in various embodiments. The type of SLM 340 (e.g., speed, size, etc.) can be selected to improve the creation of the 3-D perception. While DLP DMDs operating at higher refresh rates may be easily incorporated into stationary systems 300, and wearable systems 300 may use DLPs of smaller size and power. The power of the DLP changes how 3-D depth planes/focal planes are created. The image processor 310 is operatively coupled to the SLM 340, which encodes the light from the light source 320 with the desired virtual content. Light from the light source 320 may be encoded with the image information when it reflects off of, emits from, or passes through the SLM 340.

Light from the SLM 340 is directed to the LOEs 390 such that light beams encoded with image data by the SLM 340 are effectively propagated along a single LOE 390 for delivery to an eye of a user. Each LOE 390 is configured to project an image or sub-image that appears to originate from a desired depth plane or FOV angular position onto a user's retina. The light source 320 and the LOEs 390 can therefore selectively project images (synchronously encoded by the SLM 340 under the control of the controller 330) that appear to originate from various depth planes or positions in space. By sequentially projecting images using each of the light source 320 and the LOEs 390 at a sufficiently high frame rate (e.g., 360 Hz for six depth planes in one color at an effective full-volume frame rate of 60 Hz, or 1080 Hz for six depth planes in RGB full color at 60 Hz), the system 300 can generate a 3-D image of virtual objects at various depth planes that appear to exist simultaneously in the 3-D image.

The controller 330 is in communication with and operatively coupled to the image processor 310, the light source 320, and the SLM 340 to coordinate the synchronous display of images by instructing the SLM 340 to encode the light beams from the light source 320 with appropriate image information from the image processor 310.

The forward facing FOV cameras 350 are configured to capture images and/or videos of the users FOV. The forward facing FOV cameras 350 may be sensitive to visible light and/or invisible light such as infrared. The forward facing FOV cameras 350 are operatively coupled to the image processor 310.

The pose sensors 360 are configured to record information relating to an orientation (e.g., roll, pitch, and yaw) of each of the forward facing FOV cameras 350. In one embodiment, the pose sensors 360 are inertial measurement units ("IMUs"), which may include one or more accelerometers, gyroscopes, magnetometers, and the like. The pose sensors 360 may measure force, angular change, and/or magnetic field change in N (e.g., six) degrees of freedom. The proximity of the pose sensors 360 to respective forward facing FOV cameras 350 increases the accuracy of the pose information for the forward facing FOV cameras 350. In some embodiments, the pose sensors 360 are coupled (permanently or removably) to the forward facing FOV cameras 350.

The system 300 also includes an optional eye-tracking subsystem 370 that is configured to track the user's eyes and determine the user's focus. In one embodiment, the system 300 is configured to illuminate a subset of the LOEs 390, based on input from the eye-tracking subsystem 370 such that the image is generated at a desired depth plane that coincides with the user's focus/accommodation. For example, if the user's eyes are parallel to each other, the system 300 may illuminate the LOE 390 that is configured to deliver collimated light to the user's eyes, such that the image appears to originate from optical infinity. In another example, if the eye-tracking sub-system 370 determines that the user's focus is at 1 meter away, the LOE 390 that is configured to focus approximately within that range may be illuminated instead.

Surface Modeling

The system 300 configured to model surfaces of a real-world physical environment, according to one embodiment, is described above. A method of modeling a surface of a real-world physical environment using such a system is described below.

Figure 4:
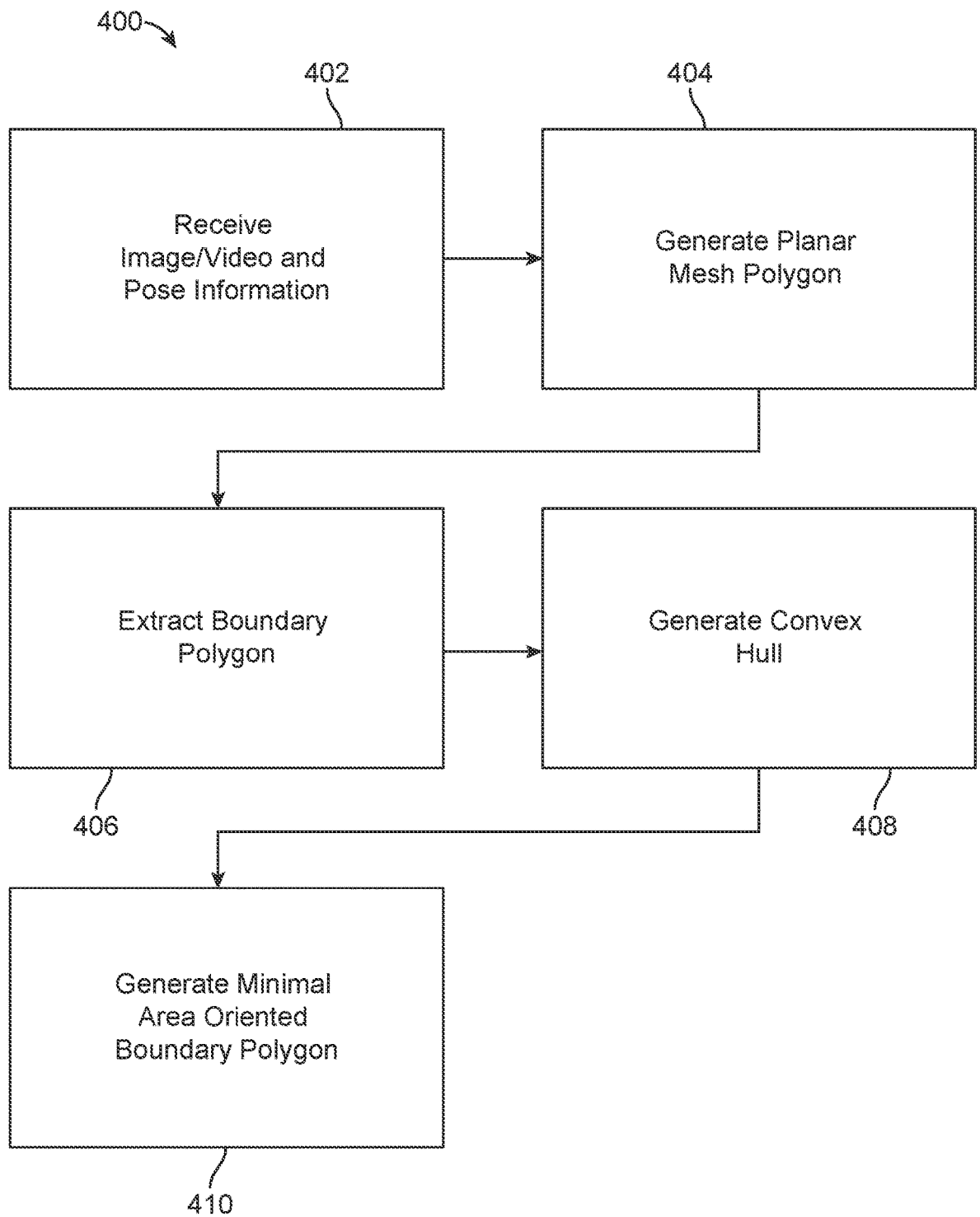
FIG. 4 is a flowchart illustrating a method using an AR/MR system to generate a surface model of a real-world physical environment, according to one embodiment.

FIG. 4 is a flowchart illustrating a method 400 using the system 300 (including a forward facing field of view (FOV) camera 350, a pose sensor 360, and an image processor 310) to generate a surface model of a real-world physical environment, according to one embodiment. At step 402, the system 300 (e.g., the image processor 310) receives one or more images or videos of the physical environment in which the system 300 is disposed. The images/videos may be received from the forward facing FOV cameras 350. The system 300 may be configured to capture images using the forward facing FOV cameras 350 such that only static portions of a series of images of the physical environments are captured, while dynamic portions are ignored.

Alternatively, the images/videos may be received from cameras of other systems 300 (e.g., of other users) in the physical environment. When images/videos are received from one or more cameras, the points in those images/videos are registered to a single reference frame having a common coordinate system. The images/videos may be received in real time relative to their capture, or they may have been previously captured and stored (e.g., in memory of a server to which the system 300 is communicatively coupled). Receiving images/videos of the same physical environment from one or more positions and orientations/angles increases the accuracy of the surface modeling by reducing the amount of surfaces in the physical environment for which there is no optical information.

Pose information may be received from the pose sensors 360 of the system 300, which are placed adjacent respective forward facing FOV cameras 350. The image processor 310 uses the pose information to generate a 3-D point cloud corresponding to the physical environment from the images/videos thereof. In a single image embodiment, the 3-D point cloud represents each sample point and its position in a three-dimensional coordinate system (e.g., X, Y, Z) as determined from the image and the pose information relating to the forward facing FOV camera 350 that captured the image. Such information can be obtained using time of flight information analysis. In a multiple image embodiment, the 3-D point cloud represents an average of each sample point in each image and the average position in the three-dimensional coordinate system as determined from the images and, in some cases, the respective pose information. Such information may be obtained using time of flight analysis and/or triangulation.

A depth sensing system may also be used to generate a 3-D point cloud. Depth sensing is the determination of the distance between a known point in three 3-D space (e.g., a depth sensor or the forward facing FOV camera 350) and a point of interest ("POI") on a surface of a real-world physical object. Depth sensing is useful for many computer vision systems, including AR/MR systems. One approach to depth sensing includes measuring respective angles between optical axes of two images (which are separated by a known distance at a known orientation) of a single POI on a surface and POIs on the respective images. The depth of the surface is determined by triangulating the measured angles and the known distance between the image capture locations. A time of flight camera can be considered a type of depth sensor.

Figure 6:
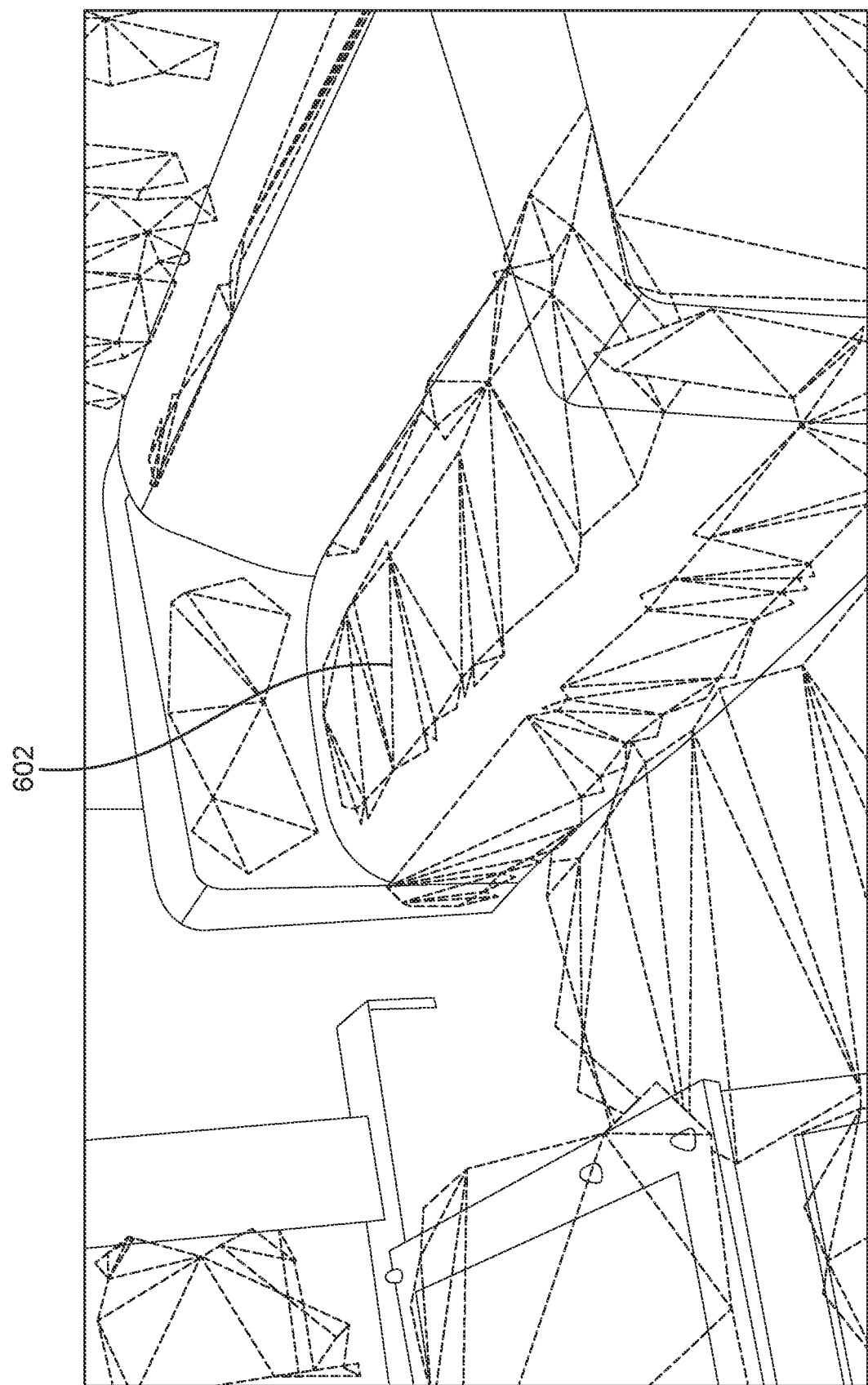
FIG. 6 depicts a planar polygon mesh representing a surface of a real-world physical environment, according to one embodiment.

At step 404, the system 300 (e.g., the image processor 310 thereof) generates a planar polygon mesh from the received images/videos. Referring briefly to FIG. 6, it illustrates planar polygon/triangular meshes 602, according to one embodiment. One or more planar polygon meshes (e.g., the planar polygon/triangular meshes 602 as shown in FIG. 6) may be formed from the images/videos/3-D point clouds captured or constructed from the physical environment to delineate and/or represent surfaces in the physical environment. In one embodiment, a marching cubes algorithm is used to generate a nonplanar mesh from the received images/videos, and the planar polygon mesh 602 is derived from the nonplanar mesh.

In another embodiment, at step 404, the system 300 generates the planar polygon mesh 602 based on a 3-D point cloud by computing a truncated signed distance function ("TSDF") for the 3-D point cloud. For example, the TSDF for the 3-D point cloud is used to generate a nonplanar mesh, for example, using a marching cubes algorithm, and the planar polygon mesh 602 is derived from the nonplanar mesh. A TSDF includes a numerical value for each point in the 3-D point cloud. The value is zero when a point is in a particular plane, positive when a point is above (using a particular court system) the particular plane, and negative when a point is below the particular plane. The computed TSDF is then used to define a 3-D volumetric grid of bricks or boxes, which are aligned in, above, and below the particular plane. Finally, the 3-D volumetric grid is tessellated with marching cubes to generate a nonplanar mesh, and the nonplanar mesh is analyzed and transformed to the planar polygon mesh 602 representing a particular surface. The tessellation process can be controlled to include or exclude round or sharp edges. In addition, the nonplanar mesh may be simplified by collapsing near/adjacent polygons having the same orientation into larger polygons. In some examples, the generated planar polygon mesh 602 may also be simplified by collapsing near/adjacent polygons having the same orientation into larger polygons.

Various embodiments can also force planarity orthogonal to a gravity vector detected by the pose sensor 360 (e.g., IMU). In other words, if the physical environment includes a conference table having various objects (e.g., telephones, laptop computers, coffee mugs, etc.) thereon, these embodiments can remove those objects from the planar polygon mesh, such that the mesh delineates/represents only a horizontal surface of the conference table. Similarly, the system 300 can also be configured to force planarity of vertical surfaces such as walls and whiteboards. Other embodiments can force planarity and any predetermined angle by substituting any direction vector for the gravity vector.

Figure 7:
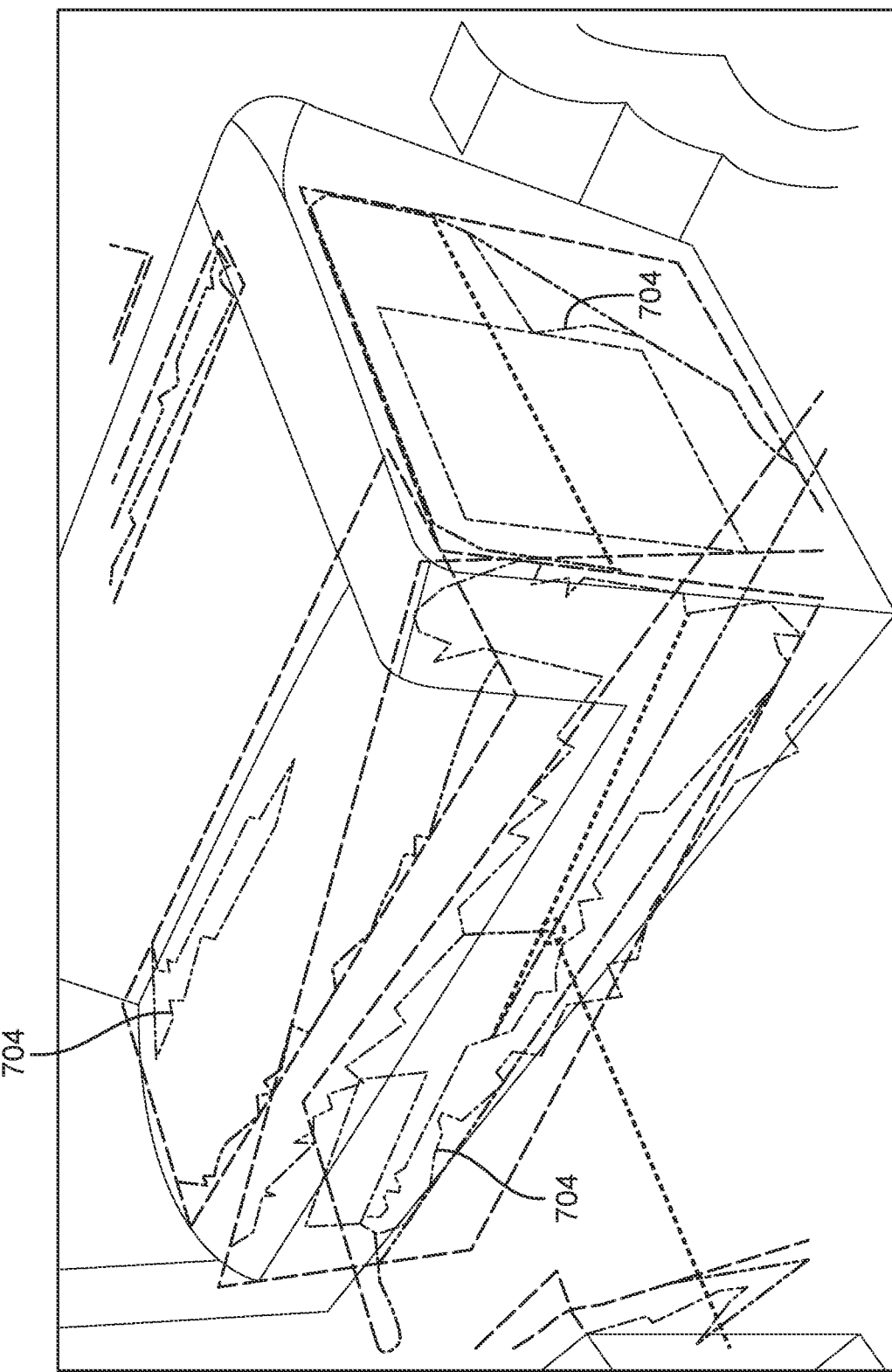
FIG. 7 depicts a boundary polygon extracted from a planar polygon mesh, according to one embodiment.

At step 406, the system 300 (e.g., the image processor 310 thereof) extracts a boundary polygon of the planar polygon mesh. Referring briefly to FIG. 7, it illustrates a boundary polygon 704 extracted from the planar polygon meshes 602 of FIG. 6, according to one embodiment. Extracting the boundary polygon 704 from the planar polygon mesh 602 may include removing portions of the planar polygon mesh 602 that do not face an external surface of the planar polygon mesh 602. As shown in FIG. 7, generating the boundary polygon 704 simplifies the model of the surface by removing numerous smaller polygons in the planar polygon mesh 602. In general, processing a larger number (e.g., 100,000s) of smaller polygons requires more processor (e.g., CPU/GPU) cycles and battery power, and generates more heat. In some embodiments, "landlocked" holes (i.e., spaces in a structure surrounded by the structure) in the polygon mesh 602 may be ignored in generating the boundary polygon 704, while "bays" (i.e., spaces in a structure mostly surrounded by the structure like bays in a geographical map) in the planar polygon mesh 602 may be included in generating the boundary polygon 704.

Figure 8:
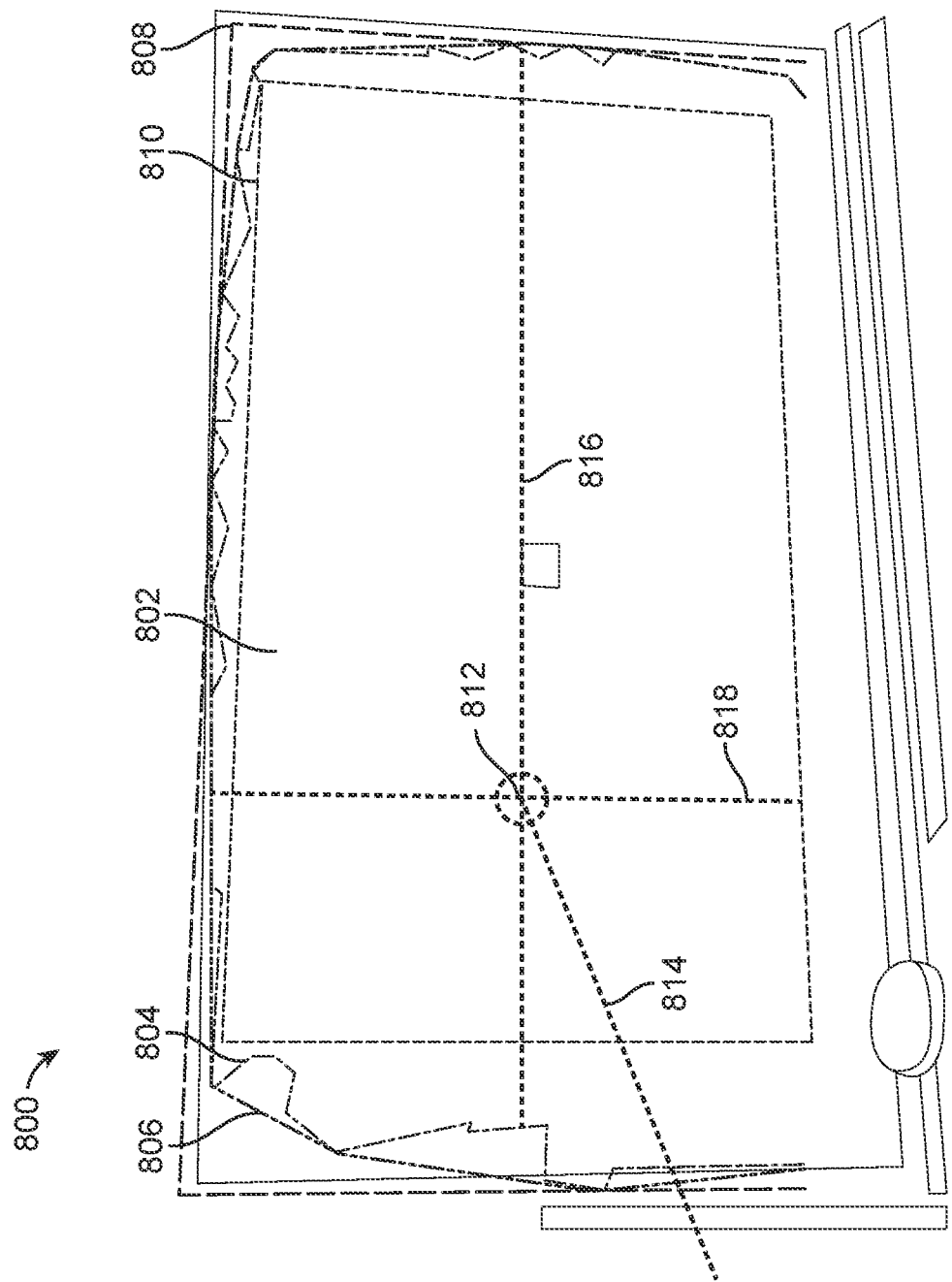
FIG. 8 depicts a user interface for interacting with a surface model of a real-world physical environment, according to one embodiment.

At step 408, the system 300 (e.g., the image processor 310 thereof) generates a convex hull from the extracted boundary polygon. Referring briefly to FIG. 8, it illustrates a convex hull 806 generated from an extracted boundary polygon 804, according to one embodiment. The convex hull 806 around the boundary polygon 804 is a mathematical function analogous to wrapping the boundary polygon 804 with a tight rubber band or tight plastic wrap. The result is that no line on the convex hull 806 penetrates the boundary polygon 804 to reach inside of the boundary polygon 804. In one embodiment, the convex hull 806 is generated from the boundary polygon 804 using a Graham-Scan algorithm. Generating the convex hull 806 from the boundary polygon 804 may include drawing lines to connect the "high points" of the boundary polygon 804 (e.g., the points of the boundary polygon 804 farthest away from a center thereof).

Both the boundary polygon 804 and the convex hull 806 represent a vertical surface of a real-world physical whiteboard 802.

At step 410, the system 300 (e.g., the image processor 310 thereof) generates a minimal area oriented boundary polygon ("MAOBP") from the convex hull. Referring briefly to FIG. 8, it illustrates a MAOBP 808 generated from the convex hull 806, according to one embodiment. The MAOBP 808 is the smallest polygon of a predetermined shape that can contain the convex hull 806 (and therefore the boundary polygon 804). In the embodiment depicted in FIG. 8, the MAOBP 808 is a rectangle that is oriented along a gravity vector and orthogonal to the floor. In one embodiment, the MAOBP 808 is generated from the convex hull 806 using a rotating calipers algorithm. Generating the MAOBP 808 from the convex hull 806 requires relatively less computation than other modalities of representing surfaces in the physical environments.

The MAOBP 808 is particularly useful for certain applications because it contains the entire convex hull 806, and therefore the boundary polygon 804. One application for which an MAOBP 808 is suited is the display of virtual media (e.g., a comic book or a movie) on a surface of the physical environment. For some virtual display applications, having minor portions of the virtual media extending beyond the actual physical surface and into space is not particularly distracting. Further, in some embodiment, the MAOBP 808 may capture the full underlying surface more accurately than other methods, resulting in very few instances of minor portions of the MAOBP 808 extending to empty space.

Figure 9B:
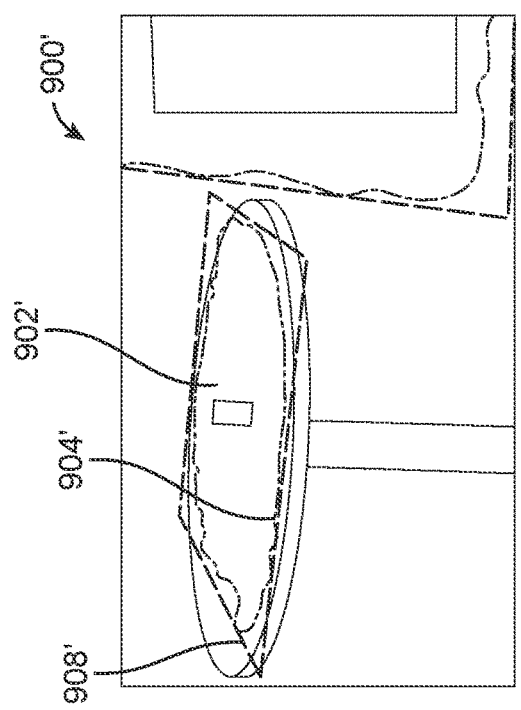
FIGS. 9A-9C depict three instances of user interfaces for interacting with a surface model of a real-world physical environment, according to another embodiment.
Figure 9C:
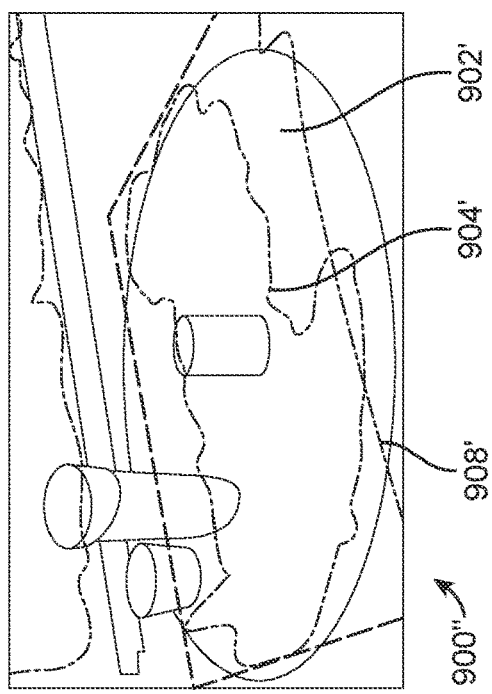
Figure 9A:
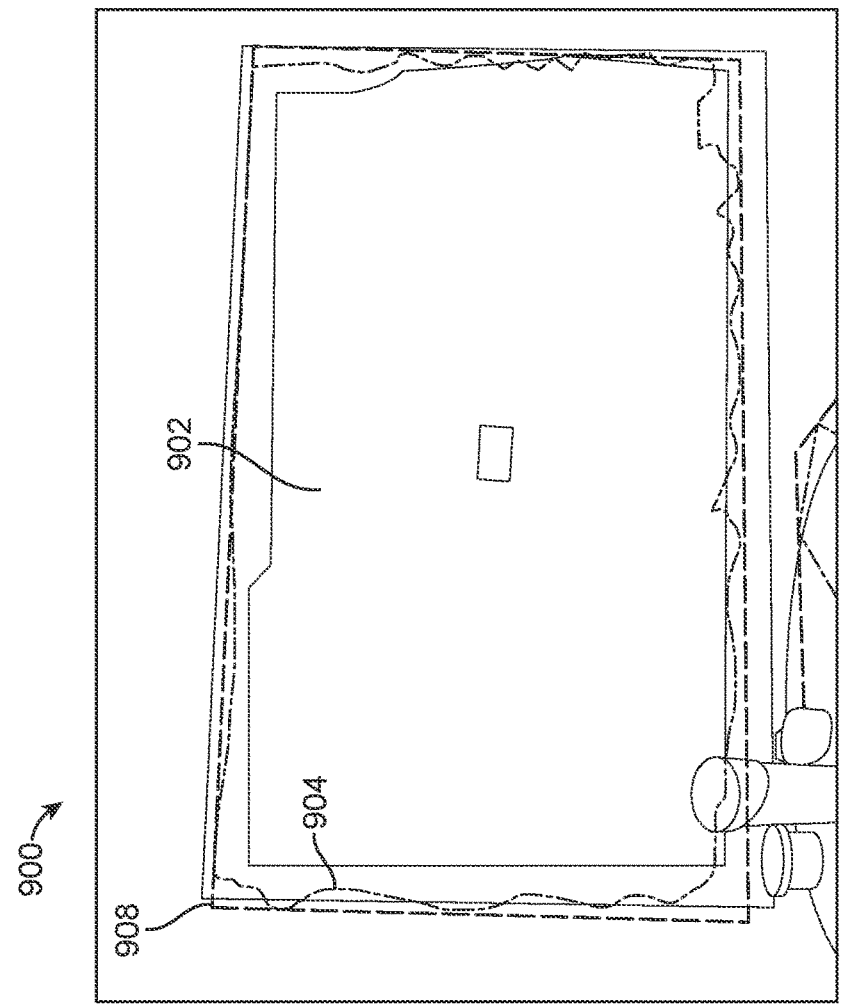

FIGS. 9A-9C also illustrate two MAOBPs 908, 908' formed around respective boundary polygons 904, 904'. Both the MAOBPs 908, 908' and the respective boundary polygons 904, 904' represent surfaces of respective real-world objects (whiteboard 902, tabletop 902'). As shown in FIGS. 9A-9C, the MAOBP 908 representing the whiteboard 902 is a better fit (i.e., more accurate correlation) to the corresponding boundary polygon 904 and the whiteboard 902 (i.e., has less extra empty space), when compared to the MAOBP 908' representing the tabletop 902'. FIGS. 9A-9C depict three instances of user interfaces 900, 900', 900" (e.g., displayed to a user of the system 300) for interacting with a surface model of a real-world physical environment.

FIGS. 9A-9C illustrate that MAOBPs 908, 908' may not be well-suited for other applications. For instance, using the MAOBP 908' in an application where a virtual character is walking on a tabletop 902' may result in the character walking off of the table and being suspended in midair. To address this problem, other polygons may be generated to delineate/represent surfaces in the physical environment.

Figure 5:
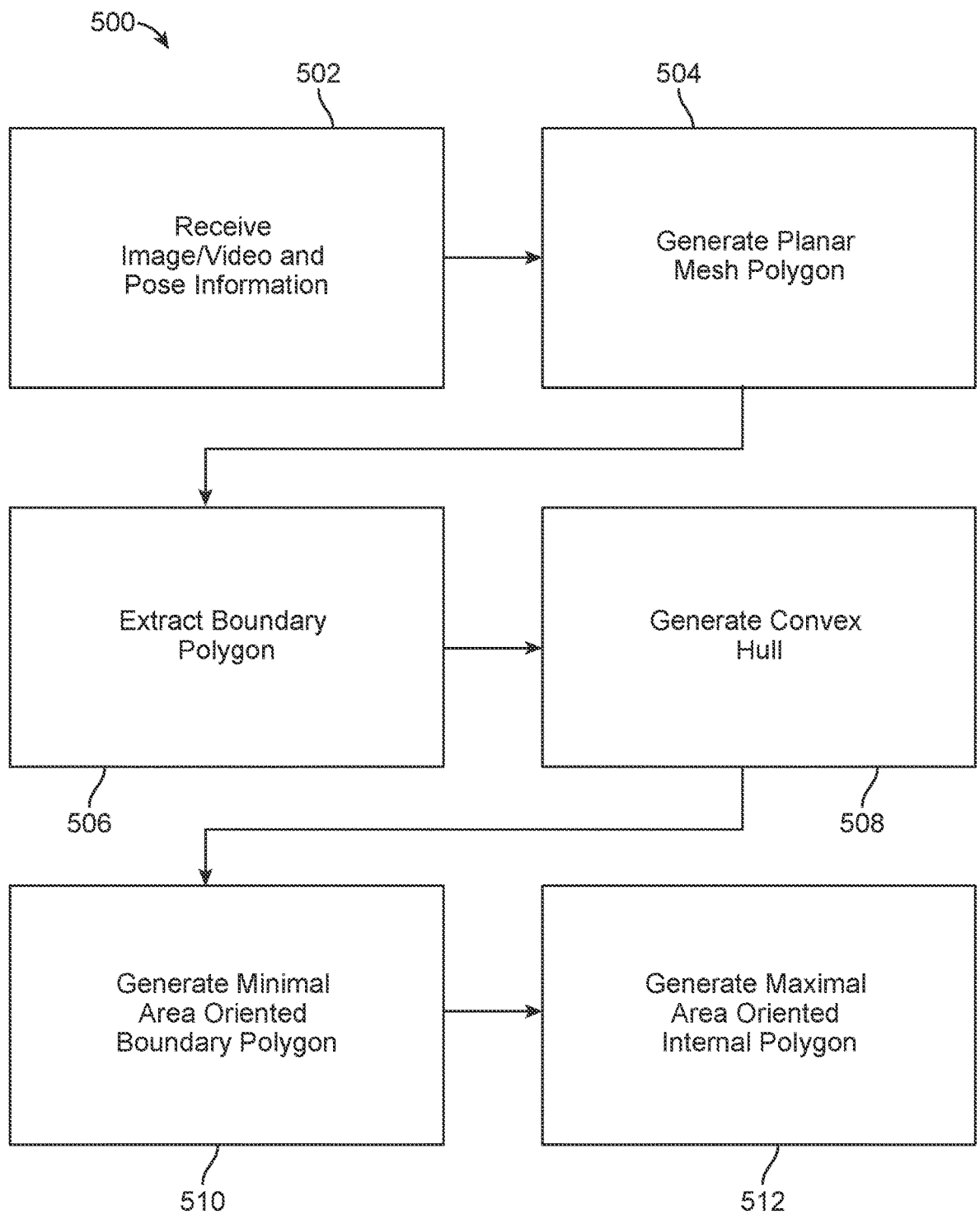
FIG. 5 is a flowchart illustrating a method using an AR/MR system to generate a surface model of a real-world physical environment, according to another embodiment.

For instance, FIG. 5 is a flowchart illustrating a method 500 using the system 300 (including a forward facing FOV camera 350, a pose sensor 360, and an image processor 310) to generate a surface model of a real-world physical environment, according to another embodiment. Steps 502 to 510 are identical to corresponding steps 402 to 410 in FIG. 4, respectively. As described above with respect to FIG. 4, the result of steps 502 to 510 with respect to FIG. 8 is the boundary polygon 804, the convex hull 806, and the MAOBP 808.

At step 512, the system 300 (e.g., the image processor 310 thereof) generates maximal area oriented internal polygon ("MAOIP") of the boundary polygon. Referring briefly to FIG. 8, it illustrates a MAOIP 810, according to one embodiment. The MAOIP 810 is a rectangle that is oriented along a gravity vector and orthogonal to the floor. In one embodiment, the MAOIP 810 is generated by performing a search in a search area (e.g., defined by the MAOBP 808). A grid is overlaid on top of the search area and each point in the grid is sequentially extended in the plane of the boundary polygon 804 to form an internal polygon, which is then sequentially tested to determine whether it is entirely contained in the boundary polygon 804. The internal polygons including portions outside of the boundary polygon 804 are discarded from the analysis. Finally, the areas of each of the internal polygons contained in the boundary polygon 804 are compared to identify the internal polygon with the largest area.

Generating the MAOIP 810 using the above-described grid and search algorithm is computationally expensive compared to other modalities (e.g., MAOBP) of representing surfaces in real-world physical environments. Using the MAOBP 808 as the search area requires the system 300 to walk through the maximum number of grid points. In order to address this issue, a method may use an user interface 800 in FIG. 8 to facilitate user input in order to limit the size of the search area. The user interface 800 includes a cursor 812, which is defined by a line 814 projecting from the head worn display of the system 300. The user can move the cursor 812 by moving their head or a totem relative to the whiteboard 802. The cursor 812 defines a search area by extending in X (816) and Y (818) directions in the plane of the boundary polygon 804.

While the search area in FIG. 8 is only slightly smaller than the MAOBP 808, in other embodiments the search area may be significantly smaller than the MAOBP 808. One such embodiment is shown in user interface 900" in FIG. 9C, where the boundary polygon 904' has a different shape from the tabletop 902'. The search area may be oriented to be orthogonal to the gravity vector or rotated relative to the gravity vector.

Another method for addressing the computational load of searching for the MAOIP 810 is to adjust the resolution of the grid forming the search area. Reducing the resolution of the grid reduces the computational load. In one embodiment, the resolution of the grid is adjusted based on the size of the search area. For a large search area, the resolution is decreased. Conversely, for a small search area, the resolution is increased.

The MAOIP 810 is particularly useful for certain applications because it contains only points within the boundary polygon 804. One application for which the MAOIP 810 is suited is an application or game in which a virtual character is walking on the tabletop 902'. For this application, defining a surface as including only points inside of the boundary polygon 904' prevents anomalies such as the virtual character walking off of the tabletop 902' and becoming suspended in midair.

Data Structure for Storage and Use

Figure 10:
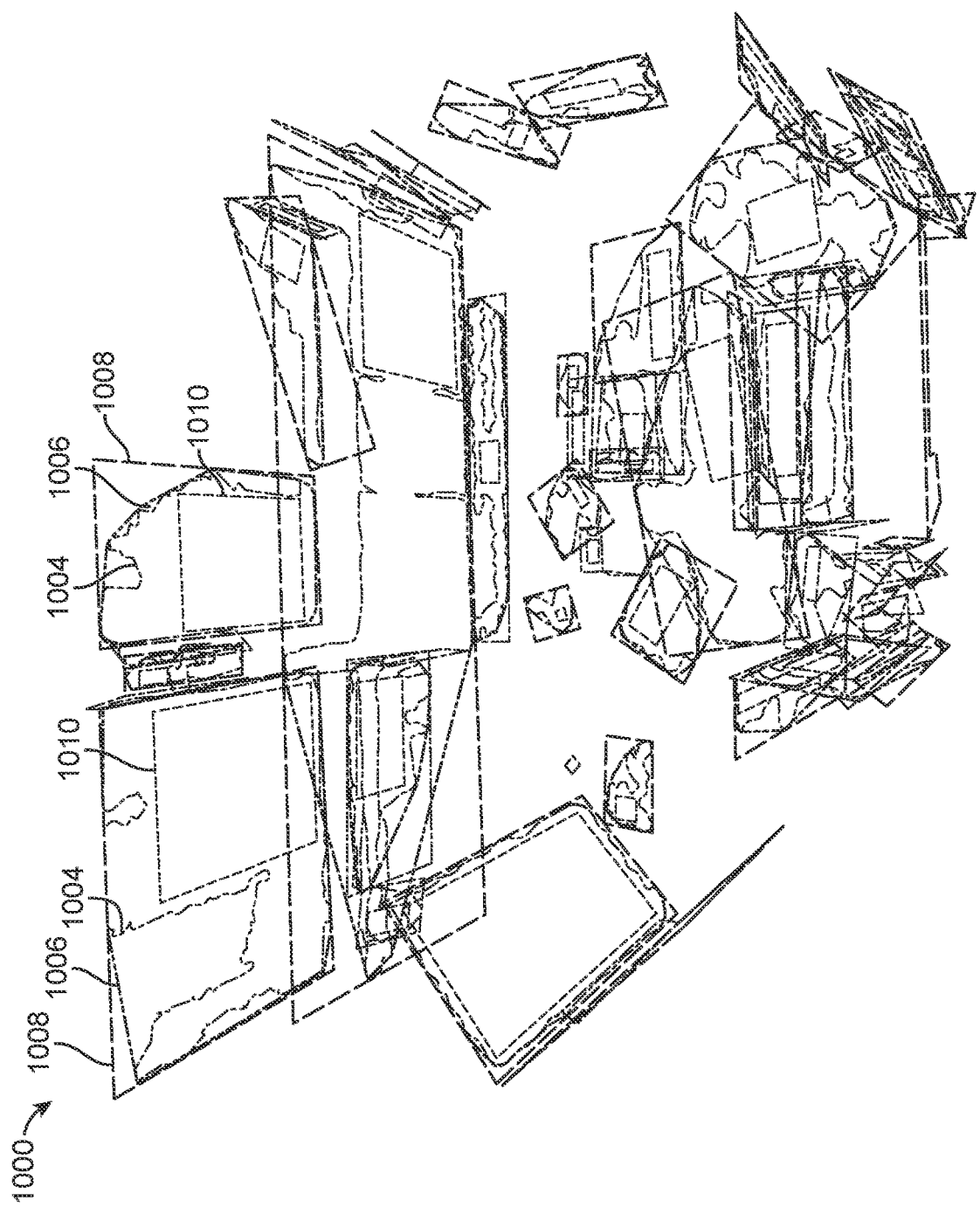
FIG. 10 depicts a 3-D surface model representing one or more surfaces in a room, according to one embodiment.

FIG. 10 depicts a 3-D surface model 1000 (hereinafter referred to as "model 1000") representing multiple major surfaces in a room (including the furniture therein). The model 1000 is generated as described above and the surfaces have been selected to be either parallel or orthogonal to the gravity vector. The model 1000 includes extracted boundary polygons 1004, convex hulls 1006, MAOBP 1008, and MAOIP 1010. This model 1000 would be particularly useful to applications that interact with vertical surfaces (e.g., displaying media) and horizontal surfaces (e.g., placement of virtual objects with simulated interactions with surfaces in gravity). 3-D models such as the model 1000 depicted in FIG. 10, can be stored in and transmitted to application/AR/MR systems using minimal storage and bandwidth. Further, such 3-D models can be used to simulate physical collisions, simulate resting contact, and display various lighting effects (e.g., shadows and reflections) with additional minimal processing by the applications/AR/MR systems.

3-D surface models like the model 1000 depicted in FIG. 10 provide position and orientation information for surfaces in a physical environment without the use of fiducial markers (e.g., ArUco markers). In addition, the 3-D surface models provide estimated surface extent information, which cannot be provided by fiducial markers. An MAOBP overestimates the extent of a surface, and an MAOIP underestimates the extent of a surface.

The extracted boundary polygons, convex hulls, MAOBP, and MAOIP in FIG. 10 can be stored in memory (e.g., the memory 312 of the system 300) and communicated to various applications using minimal amounts of memory and bandwidth compared to using planar mesh polygons to represent surfaces in physical environments. In one embodiment, data representing a rectangle (e.g., a MAOBP or a MAOIP) can be X, Y, Z coordinates (e.g., of the four corners of the rectangle) in a predefined 3-D coordinate system. In another embodiment, data representing a rectangle can be a coordinates representing a center of the rectangle (e.g., X, Y coordinates) and a quaternion (4 numbers) representing a length and width of the rectangle.

This data format both reduces the memory and bandwidth requirements, and is configured for simple, low computation manipulation to arrive at other surface characteristics often used by mixed reality applications. For instance, length and width of a rectangle can be easily calculated by subtracting the coordinates of the four corners of the rectangle. Similarly, a center of the rectangle can be easily calculated by averaging the coordinates of the four corners of the rectangle. In addition, the vectors in a direction of the length and width of the rectangle can be used to calculate (e.g., using a cross product) a normal to the rectangle. Moreover, a coordinate system can be defined based on a length vector, a width vector, and a normal vector.

While data representing a rectangle (e.g., a MAOBP or a MAOIP) can be coordinates (e.g., of the four corners of the rectangle) in a predefined coordinate system, in other embodiments, the data representing a rectangle may also include some of these computed characteristics (e.g., length, width, center, normal, and coordinate system). In these embodiments, a slight increase in memory and bandwidth may be offset by reduced computational requirements by the applications receiving and processing the surface models.

While the MAOBPs and MAOIPs in the embodiments described above are rectangles, the system 300 can be configured to generate MAOBPs and MAOIPs in any predefined shape (e.g., circle, triangle, pentagon, and the like). The MAOBP and MAOIP in a single embodiment can be two different polygons (e.g. a triangle and a rectangle). In other embodiments, like those depicted herein, the MAOBP and MAOIP in a single embodiment can be the same shape, but at different scales. The fit between an extracted boundary polygon and a MAOBP can be calculated by subtracting an area of the extracted boundary polygon from an area of the MAOBP. In that embodiment, the smaller the difference in area, the better the fit.

As shown in FIGS. 9A-9C, the MAOBP 908 representing the whiteboard 902 is a better fit to the corresponding boundary polygon 904 and the whiteboard 902 (i.e., has less extra empty space), when compared to the MAOBP 908' representing the tabletop 902'. The system 300 can be configured to cycle through a predetermined series of known shapes to increase the fit of the MAOBP by comparing the calculated difference in areas. This would also provide a good estimate of the shape of any particular surface in the physical environment by calculating a correlation/fit value and determining whether the value is above a certain predetermined threshold (e.g., 0.9).

While the system 300 described above includes a single image processor 310 for rendering virtual images and modeling surfaces of real-world physical environments, other embodiments include separate processors for rendering and modeling. In fact, separate processors for surface modeling may reside in a server computer. The separate processors may be communicatively and operatively coupled to each other.

While the system 300 described above includes respective pairs of forward facing FOV cameras 350 and pose sensors 360, other embodiments include only a single forward facing FOV camera 350 and a single pose sensor 360. In still other embodiments include a pair of forward facing FOV cameras 350 and no pose sensors 360. In these embodiments, the 3-D cloud is generated using classic triangulation techniques.

While the methods 400, 500 of using a AR/MR system to generate a surface model of a real-world physical environment described above include generating a planar polygon mesh from images/videos of the physical environment, in other embodiments, polygon mesh is generated from the images/videos of the physical environment. In yet other embodiments, there is no polygon mesh. Instead, these methods extract a boundary polygon directly from the images/videos of the physical environment (e.g., using machine vision techniques).

Figure 11:
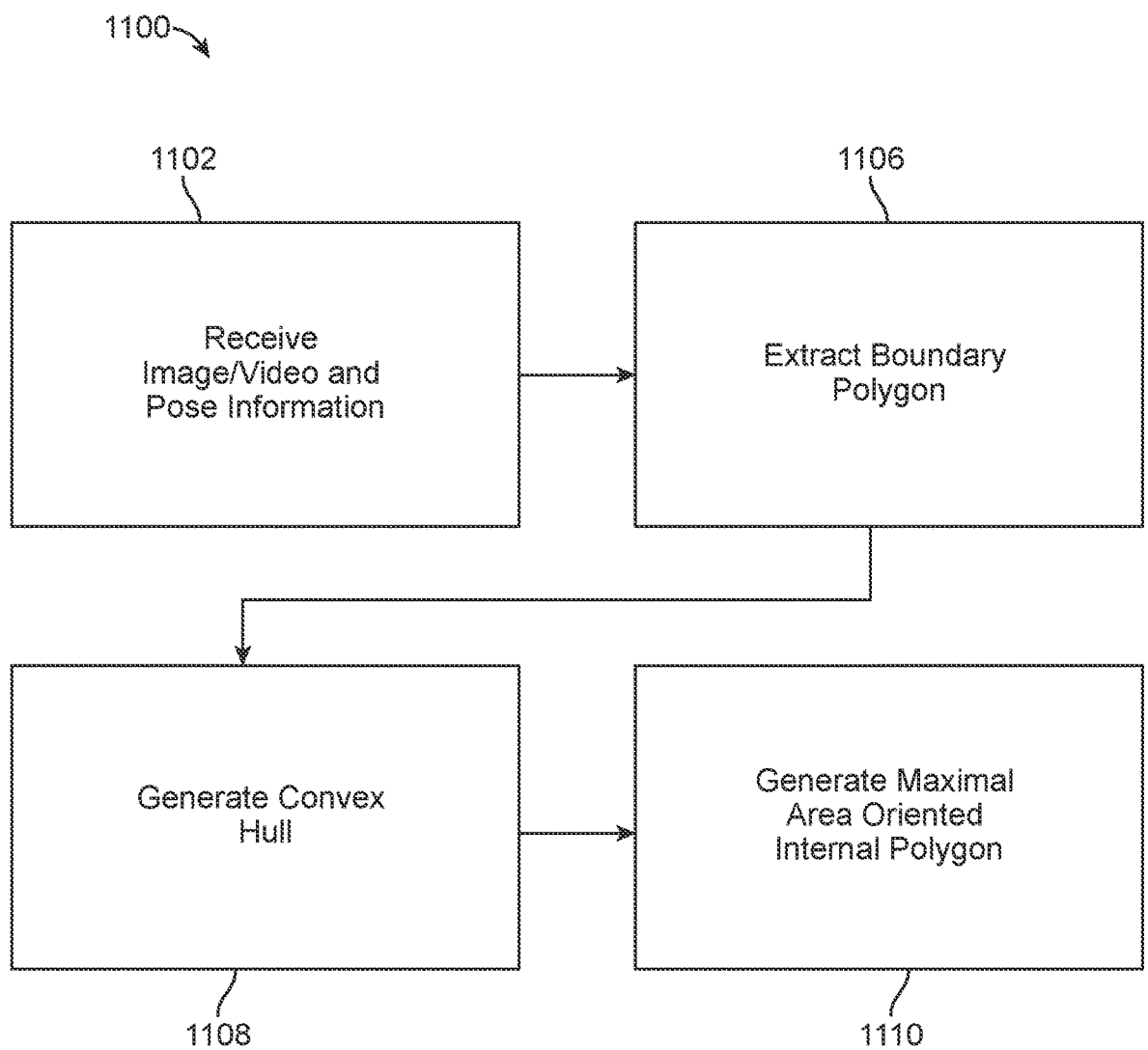
FIG. 11 is a flowchart illustrating a method using an AR/MR system to generate a surface model of a real-world physical environment, according to yet another embodiment.

For instance, FIG. 11 depicts a method 1100 using the system 300 to generate a surface model of a real-world physical environment, according to still another embodiment. Steps 1102, 1108, and 1110 are identical to corresponding steps 402, 408, and 410 in FIG. 4. The difference between the methods 400, 1100 depicted in FIGS. 4 and 11, respectively, is that at step 1106 in method 1100, the system 300 (e.g., the image processor 310 thereof) extracts a boundary polygon from the received image/video of the physical environment (e.g., using machine vision and the received pose information). The method 1100, when implemented in a system configured for efficient machine vision, may generate surface models of physical environments using less computational power (e.g., processor cycles) than methods 400, 500 that includes the step of generating a planar polygon mesh.

System Architecture

Figure 12:
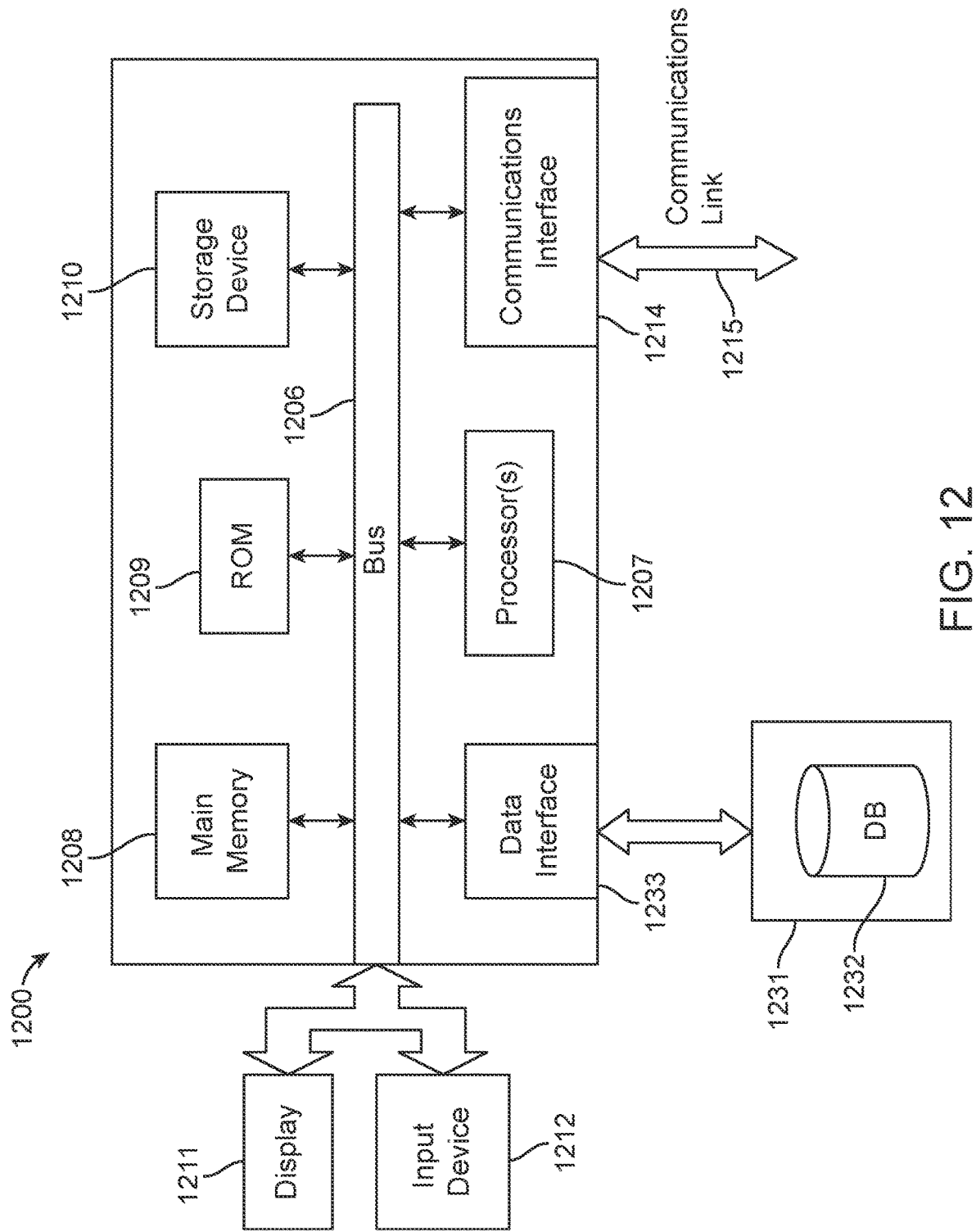
FIG. 12 is a block diagram illustrating a computing system suitable for implementing a method using an AR/MR system to generate a surface model of a real-world physical environment, according to yet another embodiment.

FIG. 12 is a block diagram of an illustrative computing system 1200 suitable for implementing an embodiment of the present disclosure. Computer system 1200 includes a bus 1206 or other communication mechanism for communicating information, which interconnects subsystems and devices, such as processor(s) 1207, system (main) memory 1208 (e.g., RAM), static storage device 1209 (e.g., ROM), disk (storage) drive 1210 (e.g., magnetic or optical), communication interface 1214, display 1211, input device 1212, data interface 1233, and cursor control.

According to one embodiment, the computing system 1200 performs specific operations by the processor 1207 executing one or more sequences of one or more instructions contained in the system memory 1208. Such instructions may be read into the system memory 1208 from another computer readable/usable medium, such as the static storage device 1209 or the disk drive 1210. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" may mean any combination of software or hardware that is used to implement all or part of the disclosure.

The term "computer readable medium" or "computer usable medium" as used herein refers to any medium that participates in providing instructions to the processor 1207 for execution. Such a medium may take many forms, including but not limited to, non-volatile media and volatile media. Non-volatile media includes, for example, optical or magnetic disks, such as disk drive 1210. Volatile media includes dynamic memory, such as system memory 1208. The "computer readable medium" may be non-transitory computer readable storage medium.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In one embodiment, execution of the sequences of instructions to practice the disclosure is performed by a single computer system 1200. According to other embodiments, two or more computer systems 1200 coupled by a communication link 1215 (e.g., LAN, PTSN, or wireless network) may perform the sequence of instructions required to practice the disclosure in coordination with one another.

The computer system 1200 may transmit and receive messages, data, and instructions, including program, for example, application code, through the communication link 1215 and the communication interface 1214. Received program code may be executed by the processor 1207 as it is received, and/or stored in the disk drive 1210, or other non-volatile storage for later execution. The computer system 1200 may transmit and receive data via the data interface 1233 from a database 1232 communicatively coupled to a database server 1231.

While the system 300 described herein has forward facing FOV cameras 350, those cameras may function as depth sensors or parts thereof. Such depth sensors are described in U.S. Provisional Patent Application Ser. No. 62/301,847, the contents of which have been previously incorporated by reference herein.

Various embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art that each of the individual variations described and illustrated herein has discrete components and features which may be readily separated from or combined with the features of any of the other several embodiments without departing from the scope or spirit of the present disclosure. All such modifications are intended to be within the scope of claims associated with this disclosure.

The disclosure includes methods that may be performed using the subject devices. The methods may include the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the invention in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the disclosure variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method of generating a surface model of a physical environment, the method being performed by an augmented reality (AR)/mixed reality (MR) system and comprising:
   an image processor of the AR/MR system obtaining an image of the physical environment;
   the image processor of the AR/MR system generating a planar polygon mesh from at least the image;
   the image processor of the AR/MR system extracting a boundary polygon from the planar polygon mesh;
   the image processor of the AR/MR system generating a convex hull for the boundary polygon; and
   the image processor of the AR/MR system generating a minimal area oriented boundary polygon (MAOBP) from the convex hull, the minimal area oriented boundary polygon (MAOBP) comprising a polygon that contains the convex hull and the boundary polygon.

2. The method of claim 1, wherein obtaining the image of the physical environment comprises: the image processor of the AR/MR system obtaining a 3-D point cloud corresponding to the physical environment using an imaging device; and obtaining pose information for the imaging device, the method further comprising the image processor of the AR/MR system computing a truncated signed distance function for the 3-D point cloud using the pose information, wherein generating the planar polygon mesh comprises the image processor of the AR/MR system tessellating the truncated signed distance function.

3. The method of claim 2, further comprising the image processor of the AR/MR system combining two smaller planar polygon meshes into one larger planar polygon mesh.

4. The method of claim 1, further comprising the image processor of the AR/MR system obtaining a gravity vector, wherein the generated planar polygon mesh is at least one of substantially parallel and orthogonal to the gravity vector.

5. The method of claim 1, wherein generating the convex hull comprises the image processor of the AR/MR system using a Graham-Scan algorithm.

6. The method of claim 1, wherein generating the minimal area oriented boundary polygon (MAOBP) comprises the image processor of the AR/MR system using a rotating calipers algorithm.

7. The method of claim 1, wherein the minimal area oriented boundary polygon (MAOBP) contains the boundary polygon of the planar polygon mesh.

8. The method of claim 1, further comprising the image processor of the AR/MR system generating a maximal area oriented internal polygon (MAOIP) that is entirely contained inside of the boundary polygon of the planar polygon mesh.

9. The method of claim 8, wherein generating the maximal area oriented internal polygon (MAOIP) comprises the image processor of the AR/MR system performing a search in a search area defined by the boundary polygon.

10. The method of claim 9, wherein generating the maximal area oriented internal polygon (MAOIP) comprises the image processor of the AR/MR system forming a grid in the search area.

11. The method of claim 10, further comprising the image processor of the AR/MR system adjusting a resolution of the grid based on a size of the search area.

12. The method of claim 8, further comprising the image processor of the AR/MR system receiving a selection of a point inside of the boundary polygon of the planar polygon mesh wherein generating the maximal area oriented internal polygon (MAOIP) comprises the image processor of the AR/MR system performing a search in a search area defined using the in selected point.

13. The method of claim 12, wherein generating the maximal area oriented internal polygon (MAOIP) comprises the image processor of the AR/MR system forming a grid in the search area.

14. The method of claim 12, further comprising the image processor of the AR/MR system adjusting a resolution of the grid based on a size of the search area.

15. The method of claim 8, wherein the minimal area oriented boundary polygon (MAOBP) and the maximal area oriented internal polygon (MAOIP) have a same shape.

16. The method of claim 1, wherein the planar polygon mesh is generated by the image processor of the AR/MR system based on a marching cubes algorithm.

17. The method of claim 1, wherein the minimal area oriented boundary polygon (MAOBP) is at least one of a rectangle, a triangle, and a circle.

18. The method of claim 1, further comprising the image processor of the AR/MR system determining a fit between the minimal area oriented boundary polygon (MAOBP) and the boundary polygon.

19. The method of claim 18, wherein determining the fit comprises the image processor of the AR/MR system calculating a difference between a first area of the minimal area oriented boundary polygon (MAOBP) and a second area of the boundary polygon.

20. The method of claim 1, further comprising the image processor of the AR/MR system storing data representing the minimal area oriented boundary polygon (MAOBP), wherein the minimal area oriented boundary polygon (MAOBP) is a rectangle.

21. The method of claim 20, wherein the data comprises four sets of coordinates corresponding to the rectangle.

22. The method of claim 21, wherein the data further comprises a length of the rectangle, a width of the rectangle, and a center of the rectangle.

23. The method of claim 21, wherein each of the four sets of coordinates is a pair of coordinates.

24. The method of claim 1, wherein generating the planar polygon mesh comprises the image processor of the AR/MR system capturing static portions of a series of images of the physical environment.

25. A system for generating a surface model of a physical environment, comprising:
an imaging device configured to obtain an image of the physical environment; and
an image processor operatively coupled to the imaging device, the image processor being configured to:
receive the image acquired by the imaging device;
generate a planar polygon mesh from at least the image;
extract a boundary polygon from the planar polygon mesh;
generate a convex hull for the boundary polygon; and
generate a minimal area oriented boundary polygon (MAOBP) from the convex hull, the MAOBP comprising a polygon that contains the convex hull and the boundary polygon.

26. The system of claim 25, further comprising
a pose sensor operatively coupled to the imaging device and the image processor,
wherein the image processor is also configured to:
compute a truncated signed distance function for a 3-D point cloud using the pose information received from the pose sensor,
generate the planar polygon mesh by tessellating the truncated signed distance function, and
extract the boundary polygon from at least the image by extracting the boundary polygon of the planar polygon mesh,
wherein the imaging device is configured to obtain the image of the physical environment by:
obtaining a 3-D point cloud corresponding to the physical environment using the imaging device; and
obtaining pose information for the imaging device using the pose sensor.

27. The system of claim 25, wherein the image processor is also configured to:
generate a maximal area oriented internal polygon (MAOIP) that is entirely contained inside of the boundary polygon of the planar polygon mesh.

28. The system of claim 27, wherein the image processor is configured to generate the maximal area oriented internal polygon (MAOIP) by:

performing a search in a search area defined by the boundary polygon;

forming a grid in the search area; and adjusting a resolution of the grid based on a size of the search area.

29. The system of claim 27, wherein the image processor is also configured to:

receive a selection of a point inside of the boundary polygon of the planar polygon mesh, and generate a maximal area oriented internal polygon (MAOIP) that is entirely contained inside of the boundary polygon of the planar polygon mesh by:

performing a search in a search area defined using the in selected point; and forming a grid in the search area, wherein the image processor is also configured to adjust a resolution of the grid based on a size of the search area.

30. The system of claim 25, wherein the minimal area oriented boundary polygon (MAOBP) is at least one of a rectangle, a triangle, and a circle.

31. The system of claim 25, wherein the image processor is also configured to store data representing the minimal area oriented boundary polygon (MAOBP), wherein the minimal area oriented boundary polygon (MAOBP) is a rectangle, and wherein the data comprises four sets of coordinates corresponding to the rectangle.

32. The system of claim 31, wherein the data further comprises a length of the rectangle, a width of the rectangle, and a center of the rectangle.

33. The system of claim 31, wherein each of the four sets of coordinates is a pair of coordinates.

34. The system of claim 25, wherein the image processor is configured to generate the planar polygon mesh from at least the image by at least capturing static portions of a series of images of the physical environment.

35. The method of claim 1, wherein the minimal area oriented boundary polygon (MAOBP) comprises a smallest polygon that contains the convex hull and the boundary polygon.

36. The method of claim 35, wherein the minimal area oriented boundary polygon (MAOBP) comprises a smallest rectangle that contains the convex hull and the boundary polygon.

37. The method of claim 35, further comprising the image processor of the AR/MR system generating a maximal area oriented internal polygon (MAOIP) that is contained inside of the boundary polygon of the planar polygon mesh.

38. The method of claim 37, wherein the minimal area oriented boundary polygon (MAOBP) overestimates an extent of a surface being modeled, and the maximal area oriented internal polygon (MAOIP) underestimates the extent of the surface being modeled.

39. The system of claim 25, wherein the minimal area oriented boundary polygon (MAOBP) comprises a smallest polygon that contains the convex hull and the boundary polygon.

40. The system of claim 39, wherein the minimal area oriented boundary polygon (MAOBP) comprises a smallest rectangle that contains the convex hull and the boundary polygon.

41. The system of claim 39, wherein the image processor is configured generate a maximal area oriented internal polygon (MAOIP) that is contained inside of the boundary polygon of the planar polygon mesh.

42. The method of claim 41, wherein the minimal area oriented boundary polygon (MAOBP) overestimates an extent of a surface being modeled, and the maximal area oriented internal polygon (MAOIP) underestimates the extent of the surface being modeled.

* * * * *